United States Patent [19]

Van Driesen et al.

[11] Patent Number: 4,684,456
[45] Date of Patent: Aug. 4, 1987

[54] CONTROL OF BED EXPANSION IN EXPANDED BED REACTOR

[75] Inventors: Roger P. Van Driesen, Titusville; William R. Adams, Upper Montclair; John Caspers, Basking Ridge; Mario Baldasarri, Paramus, all of N.J.; Harold Trimble, Panama City Beach, Fla.

[73] Assignee: Lummus Crest Inc., Bloomfield, N.J.

[21] Appl. No.: 811,651

[22] Filed: Dec. 20, 1985

[51] Int. Cl.[4] ............................................. C10G 13/02
[52] U.S. Cl. ................................... 208/143; 208/146; 208/107; 208/DIG. 1; 422/140; 422/110; 137/391; 137/392
[58] Field of Search ............... 208/107, 113, 152, 153, 208/159, 163, 164, DIG. 1, 143, 146; 422/140, 143, 110, 186, 234, 112, 195, 220, 191, 106; 137/391, 392; 222/64, 65

[56] References Cited

U.S. PATENT DOCUMENTS

| | | | |
|---|---|---|---|
| 2,323,128 | 6/1943 | Hare | 137/392 |
| 2,336,205 | 12/1943 | Willauer | 137/391 |
| 2,834,658 | 5/1958 | Lieffers et al. | 208/152 X |
| 2,857,240 | 10/1958 | Quincy | 137/391 X |
| 2,987,465 | 6/1961 | Jonanson | 208/146 X |
| 3,363,992 | 1/1968 | Chervenak | 208/143 |
| 3,761,393 | 9/1973 | Wolk et al. | 208/146 X |
| 3,765,442 | 10/1973 | Nettles et al. | 137/391 |
| 3,775,296 | 11/1973 | Chervenak et al. | 208/143 X |
| 3,968,904 | 7/1976 | Neville | 222/64 X |
| 4,220,622 | 9/1980 | Kelley | 208/DIG. 1 |
| 4,312,741 | 1/1982 | Jacquin | 208/143 X |
| 4,550,012 | 10/1985 | Penick | 422/106 |

Primary Examiner—John Doll
Assistant Examiner—Glenn A. Caldarola
Attorney, Agent, or Firm—Elliot M. Olstein

[57] ABSTRACT

In an expanded bed reactor, the expansion of the bed is automatically controlled by automatically changing the rate of speed of a recycle pump for the reactor. The bed is preferably provided with both high and low level bed detectors, and a further detector for determining abnormally high levels.

14 Claims, 1 Drawing Figure

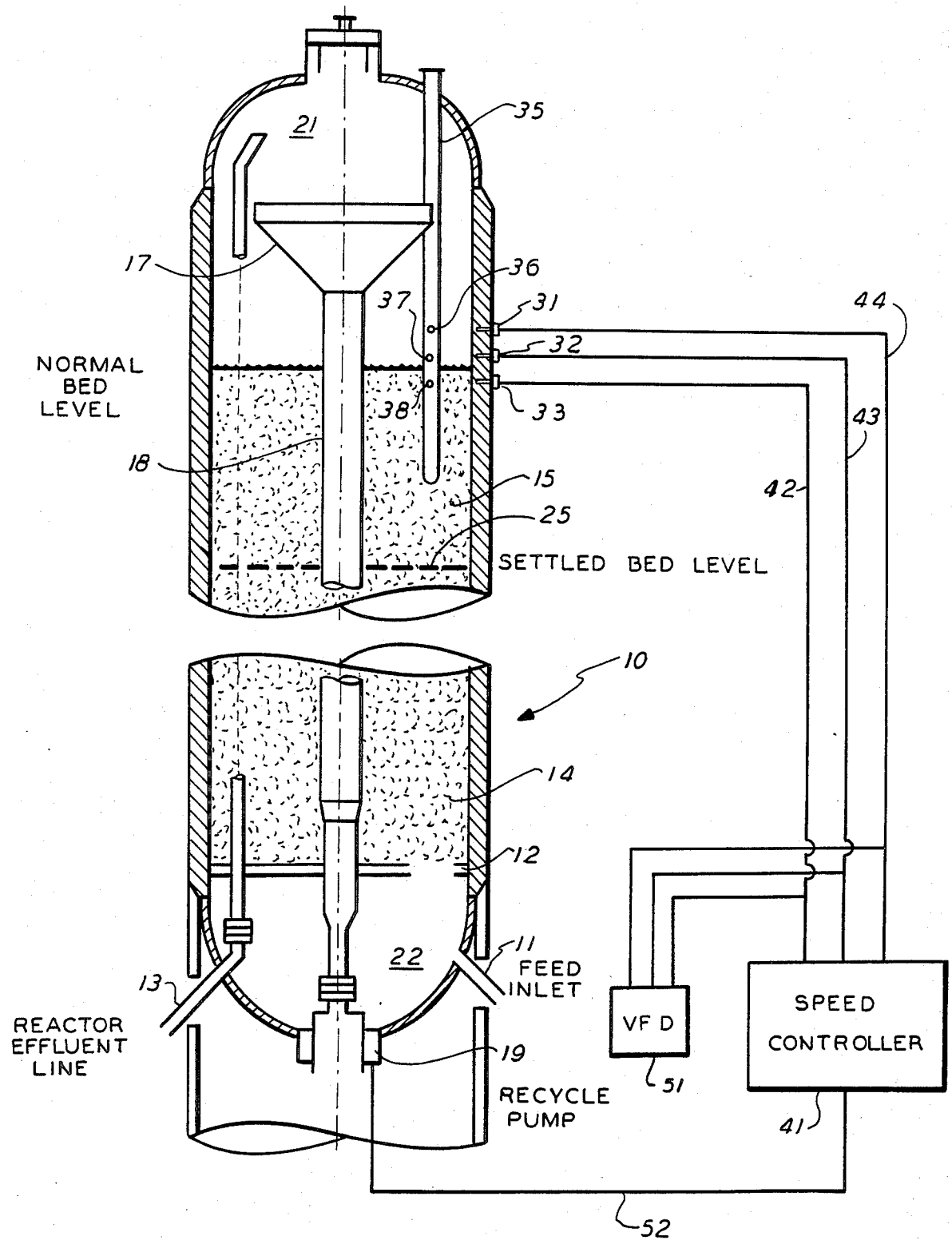

CONTROL OF BED EXPANSION IN EXPANDED BED REACTOR

This invention relates to hydrogenation in an expanded bed reactor, and more particularly to controlling the expansion of solids in an expanded bed reactor.

In an expanded bed reaction system, a feed to be upgraded, such as a heavy feed derived from either a petroleum or coal source, is introduced into the reactor with a hydrogen containing gas and the gas and feed are passed co-currently upwardly through a bed of hydrogenation catalyst, which bed is maintained in an expanded state by the flow of reactants through the bed. In addition, in such expanded bed reactors, it is conventional to recycle fluid from the top of the reactor to a lower portion in the reactor by use of a recycle pump, with the recycle material then being passed co-currently upwardly through the expanded bed along with fresh feed materials.

The present invention is directed to controlling and maintaining a desired expansion of the solid bed in an expanded bed reactor.

In accordance with one aspect of the present invention, the bed expansion in an expanded bed reactor is controlled and maintained by detecting the level of the expanded bed at a first level in the reactor and at a second level in the reactor which is higher than the first level, with the speed of the recycle pump being automatically decreased when the expanded catalyst bed is detected at the second level and with the speed of the recycle pump being automatically increased when the expanded bed is detected below the first level. In this manner, the expanded catalyst bed is automatically maintained at a level between the first and second levels in the reactor.

In accordance with a preferred aspect of the present invention, the level of the expanded bed is also detected at a third level, which is higher than the second level, with the speed of the recycle pump being decreased at a faster rate than the rate of decrease in speed which occurs when the expanded bed is detected at the second level so as to rapidly bring the level of the bed to a point in the reactor below the first level. In this manner, in the event that there is an upset in conditions which brings the bed to a level higher than the normal high bed level, the recycle pump is automatically decreased so as to rapidly lower the level of the expanded bed.

More particularly, when the bed is below the first level, the rate of speed of the recycle bed is increased at a predetermined rate until the bed is detected at the first level, and thereafter the rate of speed of the pump is maintained until the bed is detected at the second level. When the bed is detected at the second level, the speed of the recycle pump is decreased at a predetermined rate until the detector fails to detect the bed at the second level, at which time the speed of the pump is maintained until the bed falls below the first level. When the bed is detected at the third level, the speed of the recycle pump is decreased at a predetermined rate which is greater than the rate of decrease when the bed is detected at the second level until the level of the bed falls below the first level.

In accordance with a particularly preferred aspect of the present invention, the level of the expanded catalyst bed is detected by the use of a density detector in the form of a source of radiation at an interior point within the reactor at each of the first, second and third levels, and a radiation detector in the reactor wall at each of the first, second and third levels, whereby raising and lowering of the level of the bed changes the density between the radiation source and the radiation detector, with such density changes changing the detected radiation; i.e., detected radiation decreases as the density increases.

The invention will be further described with respect to the accompanying drawing, wherein:

BRIEF DESCRIPTION OF THE DRAWING

References A-B are now cited as being to obviate Applicant's invention. Note that Penick employs a fixed bed reactor, which cannot serve to provide a basis for rejection regarding Applicant's control of an ebullated catalyst bed.

The drawing is a simplified schematic representation of an expanded bed reactor including an automatic bed level control.

Referring now to the drawing, there is shown a hydrogenation reactor, generally indicated as 10, including a feed inlet 11, a distributor plate 12 and a reactor effluent line 13, which withdraws effluent from the top portion of the reactor 10. The distributor plate 12 is of a type known in the art for introducing both liquid and gas into the main portion 14 of the reactor 10, which main portion includes a bed of catalyst 15.

The reactor is further provided with a recycle pan 17, and a recycle downcomer pipe 18, which communicates or is connected to a recycle pump 19. The recycle pan is positioned in a space 21 of reactor 10 which is free of catalyst, and under the influence of the recycle pump 19, fluid which is above the bed of catalyst 15, flows downwardly through pipe 18 into the space 22 below the distribution plate 12 for recycle through the main portion of the reactor 14, which includes the catalyst bed 15.

In general, as known in the art, a feed to be upgraded, such as a heavy petroleum oil, and hydrogen are introduced through feed inlet pipe 11 into the space 22 of reactor 10, and are distributed into the catalyst bed 15 through the distributor plate 12, which includes appropriate distribution means, such as risers and bubble caps. Such features are conventional in the art for an expanded bed reactor.

The catalyst 15 is a hydrogenation catalyst of a type known in the art, such as cobalt-molybdate, and the feed is hydrogenated in the reactor 10 so as to upgrade the feed.

Liquid and gas pass through the catalyst bed 15 into the space 21 of reactor 10, and a portion of the liquid is recycled to the space 22 by the recycle pump 19. Reactor effluent is withdrawn from reactor 10 through line 13. Such features are conventional in an expanded bed reactor.

In accordance with the present invention, the normal settled level of the catalyst bed 15 is indicated by line 25, and the bed 15 is expanded during the hydrogenation operation by the upward flow of fresh feed and recycle. In accordance with the present invention, the amount or level of expansion of the catalyst bed 15 is automatically controlled by automatically controlling the speed of the recycle pump 19 in response to the detected level of the catalyst bed 15 in reactor 10. Thus, in effect, the expansion of the catalyst bed 15 is controlled by controlling the speed of the recycle pump 19, and the speed of the recycle pump 19 is automatically controlled in response to the detected level of the bed in reactor 10.

The speed of the recycle pump 19 controls the recycle rate through space 22 and distributor plate 12, with an increase in the recycle rate, which results from increasing the speed of pump 19, producing an increase in the expansion of the catalyst bed 15. Conversely, a reduction in the speed of pump 19, decreases the rate of recycle, which correspondingly decreases the amount of expansion of catalyst bed 15.

The reactor 10 is provided with bed level detectors 31, 32 and 33 at decreasing levels of height, respectively. In accordance with a preferred embodiment, the bed level detectors 31, 32 and 33 are radiation detectors.

The reactor 10 is further provided with density detector wells which are adapted to contain a source of radiation, with the wells being positioned in the interior of reactor 10. A single density detector well 35 is shown in the drawing and in actual operation, there are a plurality of such wells positioned in the reactor 10. For the sake of simplicity, the embodiment will be described with respect to a single detector well 35 containing a plurality of radiation sources; however, in practice, the radiation sources are generally placed in different detector wells.

As particularly shown, the density detector well 35 includes a first radiation source 36 positioned opposite detector 31, a second radiation source 37, positioned opposite detector 32 and a third radiation source 38, positioned opposite detector 33.

The detectors 32 and 33, and their corresponding radiation sources 37 and 38, respectively, are positioned in the bed and wall at heights which provide the desired expansion of the bed over the settled bed level 25. Thus, density detectors 32 and 33 are set at heights such that the desired normal bed level during operation of the reactor is between the density detectors 32 and 33.

The height of the density detector 31, and the corresponding radiation source 36, are positioned at a height in reactor 10 at which detection of the bed indicates an upset in the reactor, and which requires an immediate and rapid decrease in the height of the expanded catalyst bed.

The detectors 31, 32 and 33 detect the radiation from the corresponding radiation sources, with the amount of radiation which is transmitted to the detectors being related to the density of the medium between the radiation source and the detector. Thus, when the catalyst bed expands so that the bed is between the radiation source and the corresponding detector, the density of the space between the source and detector is changed, which results in a change in the radiation transmitted to the detector. Thus, the density between the detector and radiation source changes depending upon whether the bed is or is not between the detector and radiation source.

The speed of the recycle pump 19 is changed by a variable frequency drive of a type known in the art, and generally designated as 51. In accordance with a preferred embodiment, the output of the variable frequency drive, which changes the speed of the pump 19 is controlled by a speed controller of a type known in the art, and generally designated as 41. The speed controller 41 receives a signal 42 from the detector 33; a signal 43 from the detector 32, and a signal 44 from the detector 31.

In operation, when the level of catalyst falls to a point below detector 33, there is a lower density between the detector 33 and radiation source 38, and at this lower density, detector 33 receives a first amount of radiation. At this first amount of radiation, the detector 33 provides a signal 42 to controller 41 to incrementally increase the rate of speed of pump 19 so as to raise the level of the bed 15. The incremental increase in the speed of the pump 19 continues until the bed 15 reaches detector 33, which increases the density between detector 33 and radiation source 38, whereby detector 38 detects a second amount of radiation, which is lower than the first amount of radiation. When the detector detects such second amount of radiation, the pump 19 continues to operate at the speed which was previously set by signal 42; i.e., the incremental increase in the speed of pump 19 is discontinued. It is to be understood that when the terms "first amount" and "second amount" are employed with respect to radiation, such terms do not refer to a fixed amount of radiation. Thus, for example, the first amount may correspond to radiation levels above a certain amount and the second amount may correspond to radiation levels below a certain amount.

Detectors 32 detects a first amount of radiation from radiation source 37 when the catalyst bed 15 is below detector 32. As soon as the bed level reaches detector 32, the density between detector 32 and its radiation source 37 increases, and detector 32 detects a second amount of radiation lower than the the first amount of radiation. At this point, the speed controller 41 is operated by signal 43 from detector 32 so as to incrementally decrease the rate of speed of pump 19 for the purpose of reducing the level of the catalyst bed 15 to a level below detector 32. When the bed 15 moves below detector 32, then the detector 32 detects the first amount of radiation, which indicates that the bed 15 is below detector 32, and the pump 19 continues to operate at the speed previously set by signal 43 from detector 32; i.e., the incremental decrease in the rate of speed of pump 19 is discontinued. Thus, the speed of pump 19 is controlled by detector 32 when the bed reaches the level of detector 32, and the signal 43 automatically decreases the rate of speed of pump 19 until the level falls below detector 32 and then maintains a constant rate of speed until the bed falls below detector 33. Similarly, the speed of pump 19 is controlled by signal 42 from detector 33 when the bed falls below detector 33 and signal 42 automatically increases the rate of speed of pump 19 until the bed 15 reaches detector 33, and then maintains a constant rate of speed until the bed reaches detector 32 at which point the pump 19 is automatically controlled by signal 43.

As should be apparent, the detectors 32 and 33 function to automatically change and maintain the speed of the recycle pump 19 so as to maintain the level of the expanded bed at the desired normal bed level, which is between detectors 32 and 33. As should be apparent, the speed of the pump is maintained constant so long as the bed is between detectors 32 and 33, with the speed of the pump being continuously reduced until the bed falls below the level of detector 32, and being continuously increased until the level of the bed is at detector 33.

The rate of the respective increase and decrease of the speed of the pump 19 which should be used so as to maintain the bed between the levels of detectors 32 and 33, without wide changes in the bed level can be determined by those skilled in the art from the teachings herein.

As hereinabove indicated, the density detector 31 is positioned so as to indicate an upset in the reactor, which requires an immediate and rapid decrease in the height of the catalyst bed 15. When the catalyst bed reaches the level of dector 31, there is a lower density between the detector 31 and radiation source 36, and at this lower density, the detector 31 receives a first amount of radiation. At this point, detector 31 provides a signal 44 to controller 41 to incrementally decrease the rate of speed of pump 19 at a rate greater than the rate of decrease of the speed of pump 19 when the bed level reaches detector 32. The signal 44 automatically decreases the rate of speed of the recycle pump 19 to rapidly lower the level of the catalyst bed 15 until the bed falls below detector 33. At this point, the speed of the pump 19 is under the control of signal 42 from detector 33, and is controlled as hereinabove described.

The detector 31 and signal 44 function so as to maintain incremental decreases in the speed of pump 19 at a predetermined rate, in a manner similar to the detector 32 and signal 43, except that the rate of decrease is faster, and the decrease in rate continues, until the bed level falls below detector 31. At this point, depending on where the bed level is, the level is controlled by either detector 32 or 33.

As should be apparent, the speed controller 41 is a type known in the art, and may be provided with a signal 52 from a speed element (not shown) which indicates the actual speed of the pump 19. The signals 42, 43 and 44, in effect provide a set point for the speed controller 41, and based on the signal 52, the speed controller 41 changes the output of the variable frequency drive 51 so as to provide a pump speed which corresponds to the set point of controller 41, as changed in response to signals 42, 43 and 44, as hereinabove described. Thus, in effect, the speed of the pump 19 is controlled by signals 42, 43 and 44 by such signals changing the set point of controller 41 to change and maintain pump speed as hereinabove described.

Although the embodiment has been specifically described with respect to the use of a speed controller 41, it is to be understood that the speed controller 41 may be eliminated, and that signals 42, 43 and 44 may be employed to directly control the variable frequency drive 51 so as to change and maintain the speed of pump 19. The signals 42, 43 and 44 would operate in the manner hereinabove described; however, the output of the variable frequency drive 51 would be automatically changed and maintained so as to automatically change and maintain the speed of pump 19, as hereinabove described.

Although there has been no specific description of a computer and/or logic for controlling the speed controller 41 or the variable frequency drive 51, as should be apparent to those skilled in the art, such an appropriate computer and logic would be provided to operate the system as hereinabove described.

Although the pump 19 is to be operated at a constant speed, when the level of bed 15 is between the detectors 32 and 33, in accordance with a preferred embodiment, the system is operated in a manner such that the speed of the recycle pump 19 is automatically reduced, if after a predetermined period of operation, the level of the bed has not changed so as to be detected by either detector 32, 33 or 31. The speed of the pump is automatically reduced so as to bring the level of the bed below detector 33, at which point, the system operates as hereinabove described. In this manner, it can be determined that the detectors and system are properly functioning for changing the bed level automatically so as to maintain a predetermined bed height.

The present invention may be modified within the spirit and scope of the invention; accordingly, the invention is not limited to the hereinabove described preferred embodiment. Thus, for example, although the invention is preferably accomplished by use of density level detectors, it is to be understood that other means for detecting the level of the catalyst bed may be employed. Similarly, the change in speed of the pump may be accomplished other than by use of a speed controller and/or variable frequency drive as hereinabove described, although such an embodiment is preferred.

Although the embodiment has been described with respect to three detectors, it is to be understood that more than three detectors may be employed. Similarly more than one detector may be placed at each level, and the pump operated in response to all or less than all detectors at a level detecting the presence or absence of the bed.

Similarly, although the embodiment has been described with respect to an internal recycle pump, the invention is equally applicable to recycle pump external to the reactor.

As known in the art, the expanded bed reactor is particularly used for the upgrading of high boiling hydrocarbon materials derived from either petroleum or coal sources. In general, such materials have at least 25% of the components boiling above about 850° F. In general, the hydrogenation is effected in the expanded catalyst bed at temperatures in the order of from 650°–900° F., and operating pressures of from 500 psig to 4000 psig. The catalyst employed is of a type known in the art, such as cobalt-molybdate, etc., with such catalyst generally being supported on a suitable support such as alumina or silica-alumina.

The selection of a suitable feedstock, as well as catalyst and conditions should be apparent to those skilled in the art from the teachings herein.

The present invention is particularly advantageous in that it is possible to automatically control the level of an expanded bed of catalyst in a hydrogenation reactor so as to maintain a predetermined expanded bed level, and also avoid excessive bed levels which may occur from a reactor upset. Such a result is achieved without the necessity of operator intervention.

These and other advantages should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. In a hydrogenation process wherein a fluid is recycled from an upper portion of a reactor to a portion of the reactor below an expanded bed of catalyst by a recycle pump, the improvement comprising:

automatically controlling the expansion of the expanded bed of catalyst by automatically increasing the rate of speed of the recycle pump when the expanded bed is below a first level in the reactor until the bed reaches the first level; thereafter automatically maintaining a substantially constant speed for the pump until the expanded bed of catalyst reaches a second level in the reactor which is higher than the first level; automatically decreasing the rate of speed of the recycle pump until the expanded bed falls below the second level; and thereafter maintaining a substantially constant rate of speed of the recycle pump until the expanded bed falls below the first level.

2. The process of claim 1 and further comprising automatically decreasing the rate of speed of the recycle pump when the bed reaches a third level in the reactor which is higher than the second level at a rate which is greater than the rate of reduction of speed of the recycle pump when the pump reaches the second level until the expanded catalyst bed falls below the third level.

3. The process of claim 2 wherein the expanded bed is detected at first, second and third levels by detecting the density of the interior of the reactor at the first, second and third levels.

4. The process of claim 2 wherein density is detected by detecting the change of radiation between a source of radiation in the reactor at each of the first, second and third levels, and a radiation detector at each of the first, second and third levels.

5. The process of claim 4 wherein the speed of the pump is automatically controlled by controlling the output of a variable frequency drive connected to the pump.

6. The process of claim 5 wherein the variable frequency drive output is controlled by an automatic speed controller connected to the variable frequency drive.

7. A reaction system, comprising:

a reactor for an expanded catalyst bed; a recycle pump for recycling fluid from a top portion of the reactor to a portion of the reactor below a catalyst bed within the reactor for passage upwardly through a catalyst bed within the reactor; first and second bed level detection means, said second bed level detection means being positioned at a higher level in the reactor than the first bed level detection means; means for automatically controlling the speed of the recycle pump; means for providing first and second bed level signals from the first and second bed level detection means to the means for automatically controlling the speed of the recycle pump, said means for providing the first signal and the means for automatically controlling the speed of the recycle pump incrementally increasing the speed of the recycle pump when an expanded catalyst bed is below the first bed level detection means until an expanded bed of catalyst reaches the first bed level detection means and thereafter automatically maintaining a substantially constant recycle pump speed until an expanded catalyst bed reaches the second bed level detection means and the means for providing the second signal and the means for automatically controlling the speed of the recycle pump automatically incrementally decreasing the speed of the recycle pump when an expanded catalyst bed reaches the second bed level detection means and thereafter maintaining a substantially constant recycle pump speed until an expanded catalyst bed falls below the first bed level detection means.

8. The reaction system of claim 7 and further comprising a third bed level detection means positioned at a higher level than the second bed level detection means; means for providing a third signal from the third bed level detection means to the means for automatically controlling the speed of the recycle pump, said means for providing the third signal and the means for automatically controlling the speed of the recycle pump incrementally decreasing the speed of the recycle pump when an expanded catalyst bed reaches the third bed level detection means at a rate faster than the rate of decrease of the speed of the recycle pump when an expanded catalyst bed reaches the second level detection means until an expanded catalyst bed falls below the third bed level detection means.

9. The system of claim 8 wherein the first, second and third bed level detection means are density detectors.

10. The system of claim 9 wherein the density detectors are each comprised of a radiation source within the reactor and means for detecting radiation.

11. The system of claim 10 wherein the means for automatically controlling the speed of the recycle pump comprises a variable frequency drive connected to the pump.

12. The system of claim 11 wherein the means for automatically controlling the speed of the recycle pump further comprises a speed controller for controlling the variable frequency drive.

13. The process of claim 1 wherein the rate of speed of the recycle pump is automatically incrementally increased at a rate until the bed reaches the first level, and the rate of speed of the recycle pump is automatically incrementally decreased at a predetermined rate until the bed falls below the second level.

14. The process of claim 1 and further comprising automatically decreasing the rate of speed of the recycle pump when, after a period of time, the expanded bed neither falls below the first level nor reaches the second level until the expanded bed falls below the first level.

* * * * *

UNITED STATES PATENT AND TRADEMARK OFFICE
CERTIFICATE OF CORRECTION

PATENT NO. : 4,684,456

DATED : August 4, 1987

INVENTOR(S) : Roger P. Van Driesen et al.

It is certified that error appears in the above-identified patent and that said Letters Patent is hereby corrected as shown below:

Column 5, line 2, "dector" should read -- detector --.

Column 7, Claim 4, line 1, "2" should read -- 3 --.

Signed and Sealed this

Tenth Day of October, 1989

Attest:

DONALD J. QUIGG

Attesting Officer

Commissioner of Patents and Trademarks